United States Patent
Thai et al.

(10) Patent No.: US 9,600,386 B1
(45) Date of Patent: Mar. 21, 2017

(54) NETWORK TESTBED CREATION AND VALIDATION

(71) Applicant: Sandia Corporation, Albuquerque, NM (US)

(72) Inventors: Tan Q. Thai, Albuquerque, NM (US); Vincent Urias, Albuquerque, NM (US); Brian P. Van Leeuwen, Albuquerque, NM (US); Kristopher K. Watts, Idaho Falls, ID (US); Andrew John Sweeney, Brooklyn, NY (US)

(73) Assignee: Sandia Corporation, Albuquerque, NM (US)

(*) Notice: Subject to any disclaimer, the term of this patent is extended or adjusted under 35 U.S.C. 154(b) by 142 days.

(21) Appl. No.: 14/289,853

(22) Filed: May 29, 2014

Related U.S. Application Data

(60) Provisional application No. 61/829,839, filed on May 31, 2013.

(51) Int. Cl.
*G06F 11/00* (2006.01)
*G06F 11/263* (2006.01)

(52) U.S. Cl.
CPC ................. *G06F 11/263* (2013.01)

(58) Field of Classification Search
CPC ...... G06F 11/263; G06F 11/267; G06F 11/27; G06F 11/273; G06F 11/2733
See application file for complete search history.

(56) References Cited

U.S. PATENT DOCUMENTS

| 7,653,746 | B2 | 1/2010 | Touch et al. |
| 7,885,204 | B1 * | 2/2011 | Schongar ............ H04L 12/2697 370/254 |

(Continued)

OTHER PUBLICATIONS

Larry Peterson et al., "PlanetLab Architecture: An Overview," May 5, 2006, [Online] Available: http://www.planet-lab.org/files/pdn/PDN-06-031/pdn-06-031.pdf, last accessed Dec. 11, 2013, 31 pages.

(Continued)

*Primary Examiner* — Bryce Bonzo
*Assistant Examiner* — Katherine Lin
(74) *Attorney, Agent, or Firm* — Blakely, Sokoloff, Taylor & Zafman, LLP

(57) ABSTRACT

Embodiments of network testbed creation and validation processes are described herein. A "network testbed" is a replicated environment used to validate a target network or an aspect of its design. Embodiments describe a network testbed that comprises virtual testbed nodes executed via a plurality of physical infrastructure nodes. The virtual testbed nodes utilize these hardware resources as a network "fabric," thereby enabling rapid configuration and reconfiguration of the virtual testbed nodes without requiring reconfiguration of the physical infrastructure nodes. Thus, in contrast to prior art solutions which require a tester manually build an emulated environment of physically connected network devices, embodiments receive or derive a target network description and build out a replica of this description using virtual testbed nodes executed via the physical infrastructure nodes. This process allows for the creation of very large (e.g., tens of thousands of network elements) and/or very topologically complex test networks.

15 Claims, 6 Drawing Sheets

(56) References Cited

U.S. PATENT DOCUMENTS

| | | | |
|---|---|---|---|
| 8,793,117 B1* | 7/2014 | Varshney | H04L 69/18 703/21 |
| 8,874,776 B2* | 10/2014 | Serban | 709/201 |
| 8,935,506 B1* | 1/2015 | Gopalan | G06F 12/1009 711/202 |
| 2005/0163101 A1* | 7/2005 | Ashwood Smith | H04L 49/602 370/351 |
| 2006/0140125 A1 | 6/2006 | Ottinger et al. | |
| 2007/0204166 A1* | 8/2007 | Tome | H04L 63/0272 713/182 |
| 2009/0300423 A1* | 12/2009 | Ferris | G06F 11/36 714/38.1 |
| 2009/0307531 A1 | 12/2009 | Karthikeyan et al. | |
| 2009/0322518 A1* | 12/2009 | Liang | H04L 45/48 340/539.18 |
| 2011/0004456 A1 | 1/2011 | Park et al. | |
| 2012/0059921 A1 | 3/2012 | Serban et al. | |

OTHER PUBLICATIONS

Pramod Sanaga et al., "Modeling and Emulation of Internet Paths," Proceedings of the Sixth USENIX Symposium on Networked Systems Design Implementation (NSDI '09), Boston, MA, Apr. 2009, [Online] Available: http://www.cs.utah.edu/flux/papers/ipathemu-nsdi09.pdf, last accessed Dec. 11, 2013, 14 pages.

Terry Benzel, "The Science of Cyber Security Experimentation: The DETER Project," ACSAC '11, Dec. 5-9, 2011, Orlando, FL, [Online] Available: http://www.acsac.org/2011/program/keynotes/benzel.pdf, last accessed Dec. 11, 2013, pp. 137-147.

Jelena Mirkovic et al., "The DETER Project: Advancing the Science of Cyber Security Experimentation and Test," 2010 IEEE, 7 pages.

Lee M. Rossey et al., "LARIAT: Lincoln Adaptable Real-time Information Assurance Testbed," 2002 IEEE, 11 pages.

"Skaion Corporation Capabilities Statement," Skaion Corporation, North Chelmsford, MA, Feb. 7, 2012, [Online] Available: http://www.skaion.com/capabilities.pdf, last accessed Dec. 11, 2013, 2 pages.

DARPA (Defense Advanced Research Projects Agency), "Driving Technological Surprise: DARPA'S Mission in a Changing World," DARPA Framework, Apr. 2013, [Online] Available: http://www.darpa.mil/WorkArea/DownloadAsset.aspx?id=2147486475, last accessed Dec. 11, 2013, 16 pages.

"Riverbed OPNET Network R&D Solutions for Network Equipment Manufacturers, Service Providers, and Research Organizations," Riverbed Technology, Apr. 8, 2013, [Online] Available: http://media-cms.riverbed.com/documents/Riverbed_OPNET_Network_Research_Design.pdf, last accessed Dec. 11, 2013, 4 pages.

Andy Bavier et al., "In VINI Veritas: Realistic and Controlled Network Experimentation," SIGCOMM '06, Sep. 11-15, 2006, Pisa, Italy, [Online] Available: http://www.cs.princeton.edu/~jrex/papers/vini.pdf, last accessed Dec. 11, 2013, 12 pages.

Alex Chandra et al., "Field-programmable Port eXtender (FPX) Support for the Network Services Platform (NSP), Version 1.0," Sep. 23, 2005, [Online] Available: https://onl.wustl.edu/sysdocs/nsp_design_v1.pdf, last accessed Dec. 11, 2013, 99 pages.

Gautam Singaraju et al., "A Testbed for Quantitative Assessment of Intrusion Detection Systems using Fuzzy Logic," Proceedings of the Second IEEE International Information Assurance Workshop (IWIA '04), 2004 IEEE, 15 pages.

"OpenStack Compute Administration Manual," Bexar Release, Feb. 3, 2011, OpenStack LLC, [Online] Available: http://acis.ufl.edu/~david78k/openstack/docs/os-compute-admin-book.pdf, last accessed Dec. 11, 2013, 44 pages.

Andrew Sweeney, "Booting 100's of Thousands of Linux VMs," Sandia National Laboratories, Jun. 2011, [Online] Available: http://events.linuxfoundation.org/images/stories/pdf/lceu11_sweeney.pdf, last accessed Dec. 11, 2013, 38 pages.

Michael J. McDonald et al., "Cyber Effects Analysis Uisng VCSE: Promoting Control System Reliability," Sandia National Laboratories, Sep. 2008, [Online] Available: http://energy.sandia.gov/wp/wp-content/gallery/uploads/Cyber_Effects_Analysis_Using_VCSE_09.pdf, last accessed Dec. 11, 2013, 57 pages.

"PowerWorld: PowerWorld Simulator," PowerWorld Corporation, Champaign, IL, Jul. 29, 2008, [Online] Available: http://www.atsonline.co.in/pdfs/power_simulator.pdf, last accessed Dec. 11, 2013, 11 pages.

* cited by examiner

NETWORK TESTBED CREATION AND VALIDATION

CROSS REFERENCE TO RELATED APPLICATION

This application claims the benefit of U.S. Provisional Application No. 61/829,839 filed on May 31, 2013, the contents of which are incorporated herein by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to verification software, and in particular but not exclusively, relates to testing network designs and resources.

BACKGROUND INFORMATION

Portions of a network environment (e.g., hardware, software, and networking components) may be replicated in order to validate runtime aspects of the design and/or resources of the network. This replicated environment is referred to as a network testbed, and performance characteristics of the network are identified by testing the network elements and interfaces instantiated in the testbed.

Prior art network testbeds consist of physical network devices, such as switches, routers, network interface cards (NICs), and access points. It is often necessary to replicate the topology of the network to understand the operational demands on the resources in the network. For extremely large networks, replicating the corresponding environment to full scale—including a large quantity of physical devices, interfaces, and communication links, is impractical. Thus, prior art network testing solutions do not fully replicate a large and/or complex network environment, but instead create a smaller testing environment that is limited by expense (i.e., how many physical network devices are available) and by manual configuration (i.e., manually configuring and interconnecting network devices). Thus, prior art network testbeds fail to fully validate and verify large scale and/or complex network environments.

SUMMARY OF INVENTION

Embodiments of network testbed creation and validation processes are described herein. A "network testbed" is a replicated environment used to validate a target network or an aspect of its design. Embodiments describe a network testbed that comprises virtual testbed nodes executed via a plurality of physical infrastructure nodes. The virtual testbed nodes utilize these hardware resources as a network "fabric," thereby enabling rapid configuration and reconfiguration of the virtual testbed nodes without requiring reconfiguration of the physical infrastructure nodes. Thus, in contrast to prior art solutions which require a tester manually build an emulated environment of physically connected network devices, embodiments receive or derive a target network description and build out a replica of this description using virtual testbed nodes executed via the physical infrastructure nodes. This process allows for the creation of very large (e.g., tens of thousands of network elements) and/or very topologically complex test networks.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified.

DETAILED DESCRIPTION

Embodiments of a system and method for network testbed creation and validation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
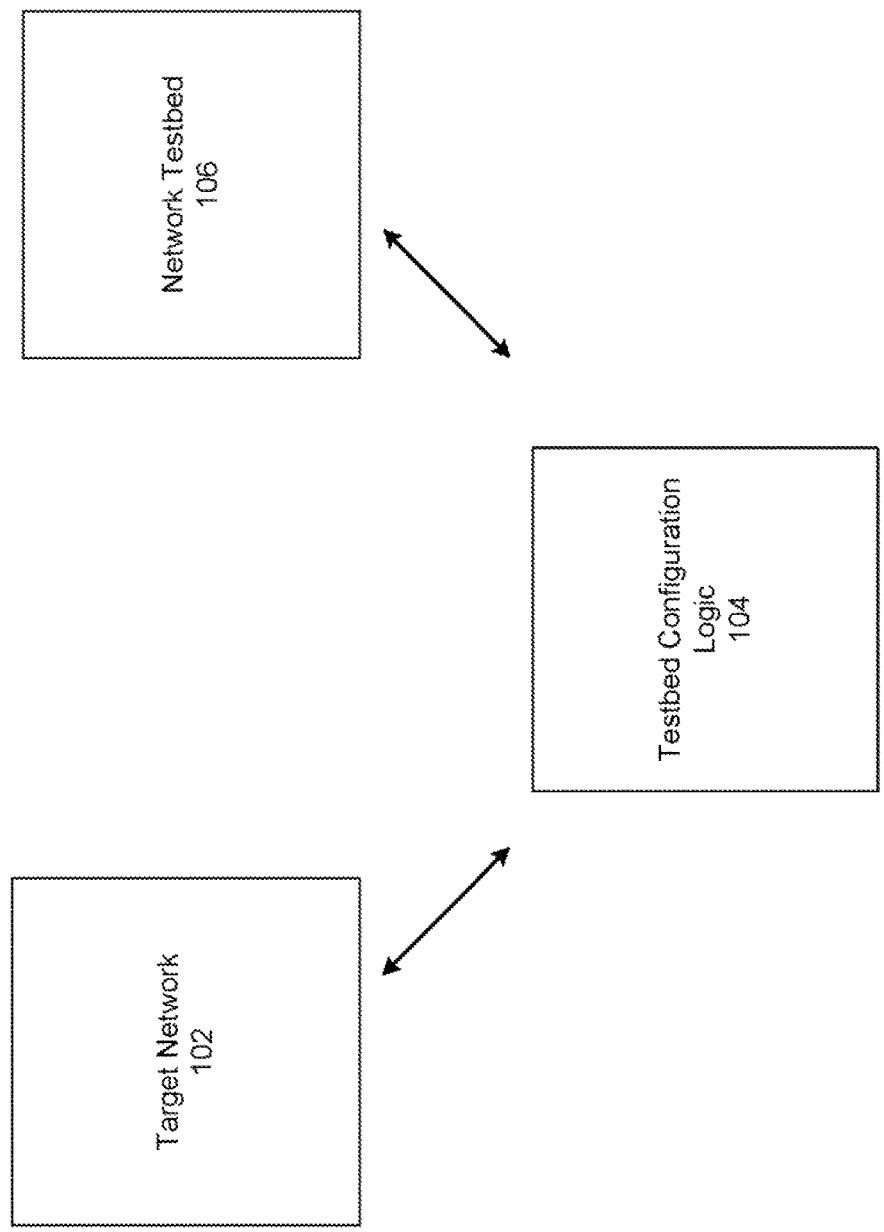
FIG. 1 is an illustration of a network testing environment according to an embodiment of the disclosure.

FIG. 1 is an illustration of a network testing environment according to an embodiment of the disclosure. In this embodiment, target network 102 is to be validated by network testbed 106. As referred to herein, a "network testbed" is a replicated environment that is used to validate the performance or effects of a target network or an aspect of its design—e.g., proposed networked computer platforms, software applications, network protocols and topologies, routing, application Quality of Service (QoS), etc. As described below, network testbed 106 is configured via network testbed configuration logic 104 to completely (or near completely) replicate the design, scale and complexity of target network 102.

Target network 102 may comprise any system that enables the transfer of data between network elements—such as devices, interfaces, and communication links. Network devices may include routers, switches, hubs, terminals, etc. These network devices are interconnected within network 102 via one or more network input/output (I/O) interfaces.

Network interfaces may be connected to each other via communication links (alternatively referred to herein as "connections"). The physical and logical relationship of network devices, interfaces, and connections of network 102 is referred to as the "topology" of network 102. A network topology describes a topological arrangement of the links, nodes, etc. of a network, including the physical arrangement of the devices, interfaces and connections within the network; examples of known network topologies include star topologies, mesh topologies, bus topologies etc. As described below, embodiments of the disclosure may accept various types of data describing a network topology. For example, said network topology may be described in a data file comprising any abstract logical description of a network design, such as an Extended Markup Language (XML) format, structures query language (SQL), HyperText Markup Language (HTML), etc.

The network topology further describes the network protocol used for transmission of data. The above described topology-related data file includes the network elements available in network 102 and the physical and logical relationship between the network elements. The topology-related data file also includes information about various properties of the network elements that are available within network 102. For example, for a router available in network 102, the topology-related data file may include information about the type of the router, the network address of the router, the hardware details of the router, and the interfaces available in the router.

The network topology may further describe the performance capabilities of a network. For example, the network topology may be used to figure out the maximum possible transfer rate of data between two routers in the network, and may be used to identify any potential problems such as slow transfer rate or loss of data during the transmission that would fall below a specified QoS.

In this embodiment, network testbed configuration logic 104 configures network testbed 106 based, at least in part, on data describing target network 102. As referred to herein, "logic" may refer to hardware, software modules, firmware modules, or any combination thereof. Network testbed configuration logic 104 may include a set of tools and Application Program Interfaces (APIs) to accept said data describing target network 102.

In embodiments of the disclosure, network testbed 106 comprises a bare-metal physical infrastructure of computing and network devices (e.g., hardware computing resources such as processors/processor cores, memory, interfaces, communication links and tools, etc.), and some combination of virtual, emulated and/or physical testbed nodes executed via the bare-metal physical infrastructure.

As described in further detail below, this division between the bare-metal physical infrastructure and the testbed nodes of network testbed 106 enables the creation a full scale (or near full scale) replicated network environment without incurring the cost or physical effort of building the design to full scale with physical devices, and without being limited by the properties of the bare-metal physical infrastructure of the network testbed. For example, embodiments of the disclosure may configure network testbed 106 to comprise a high density of virtual testbed network devices per physical node (e.g., 10,000 or more virtual machines (VMs) running at a ratio of 750 VMs per physical node, wherein each node includes four quad-core processors) while maintaining a rapid auto-configuration from a given network topology description and operating environment specification for target network 102. This high virtual testbed node density creates a highly scalable environment allowing for complex networking and distributed computing experimentation with much less physical hardware compared to prior art solutions. Furthermore, as described in further detail below, the time to reconfigure and boot an entirely new testbed experiment is significantly reduced due to the rapid re-configurability of the virtual testbed nodes of testbed 106.

As described in further detail below, the virtual testbed nodes of network testbed 106 may be fully configured to emulate corresponding network elements in target network 102. Each virtual testbed node (e.g., virtual host computer, network switch, router, information system device, cellular infrastructure network component, etc.) is fully specified with settings as it would be in target network 102. For example, a virtual testbed node corresponding to a physical router of target network 102 may be specified with the same number of interfaces, router ID, Autonomous System (AS) number, Border Gateway Protocol (BGP) routes and links, etc. Similarly, each virtual testbed node may be specified with experimental operating characteristics based on its technology (i.e. whether the virtual testbed node is emulating router, switch, host computer, etc.). These characteristics may include, for example, packet request response time, processing latencies, propagation delay, etc.

As described in further detail below, embodiments of the disclosure further enable several testbed experiment parameters to be configured in order to create realistic conditions for a scalable network within a hybrid simulation, emulation, and physical environment. These parameters may include, for example, network link quality, application software within a testbed node's operating environment, network routing protocols, and other specific items of research interest.

Thus, embodiments of the disclosure may be used to emulate any large scale computer network system, such as an enterprise networking environment, supervisory control and data acquisition (SCADA) centralized systems for monitoring and controlling entire sites, complexes of systems spread out over large areas, cellular network infrastructures, cloud computing infrastructures, etc.

Figure 2:
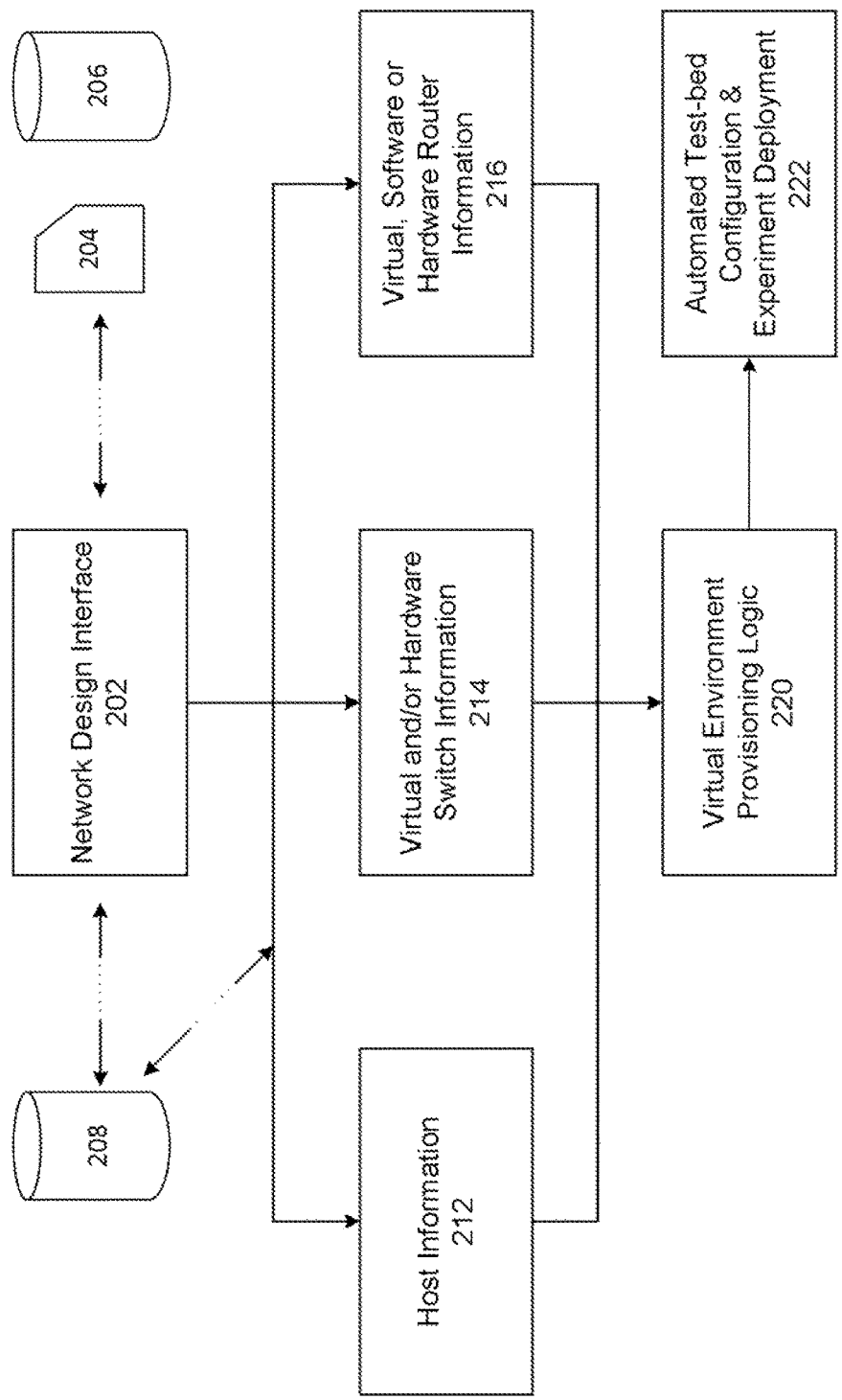
FIG. 2 is a block diagram of a network testbed configuration and experiment deployment tool according to an embodiment of the disclosure.

FIG. 2 is a block diagram of a network testbed configuration and experiment deployment tool according to an embodiment of the disclosure. Process flows as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

In this embodiment, operations are executed for creating a test network for a network testbed from network description information, such as an abstract description of network design, or runtime data from a network to be tested (i.e., target network). Network design interface 202 may receive network description information from any type of input interface—e.g., a network description retrieved from user-specified file 204, database 206, input data from a graphical user interface (GUI) or script interface, etc. Said network description information may be in any abstract logical description format or any combination of formats that describe a network topology and other operational aspects of the target network. Furthermore, in some embodiments, said network description information may comprise collected runtime network traffic data (e.g., data captured via flow capture or packet capture modules) or may comprise collected network exploratory data (e.g., network trace data from a traceroute utility or a PING utility) wherein the network topology and runtime aspects of the target network may be inferred.

Thus, a full description of the target network, including its network elements, operational characteristics, and topology, is either received or derived from the data received at interface 202. Database 208 comprises a data store of previously generated testbed node settings data. As described below, this node settings data is used to configure virtual testbed nodes of the eventual test network—shown as host information 212, virtual and/or hardware switch information 214, and virtual, software or hardware router information 216 are generated. Said test network may consist of only virtual testbed nodes, or may comprise a mix of physical and virtual testbed nodes. For example, said test network may include one or more physical network devices (e.g., switch, router, computing device endpoint, etc.) coupled to a network of virtual testbed nodes in order to test the physical device in an emulated network virtualized to full scale. These types of "hybrid" test networks may be referred to as "hardware-in-the-loop" or "system-in-the-loop" simulations.

Host information 212 may describe host configuration data such as Internet Protocol (IP), media access control (MAC), gateway and operating system (OS) information, and may also include a description of rules or network policies about the types of software applications and network traffic allowed on the host. Switch information 214 may include switch configuration information such as a static or dynamic IP address, gateway, universally unique identifier (UUID), virtual local area network (VLAN), trunk, port speed and other settings. Router information 216 may include IP, media access control (MAC), static and dynamic route configurations, and other settings for virtual, hardware or software routers.

If a virtual testbed node is to emulate a non-standard network element, (i.e., not a general purpose computer, router or switch, such as an information system network device (e.g., a networked printer or specific server), or cellular infrastructure network component (e.g., cellular phone)), the operating environment may be preloaded into the system prior to specifying this node's settings. The operating environment may be, for example, a virtual machine with the node's specific operating system image or network interface settings to a physical hardware module.

Embodiments of the disclosure further enable the customization of experimental software within each test network node. This may comprise, for example, custom routing algorithms or switching fabric hardware emulation. This also may include experimental software or faulty software installed within a computer host testbed node that is used for a fault propagation study.

Furthermore, runtime testbed node characteristics may be specified; for example, network link quality such as percent of dropped packets, burst traffic characteristics, bandwidth, latency, etc. may be specified for one or more virtual testbed nodes of the test network. These parameters may be set as constants or, for example, have random jitter characteristics described by mathematical functions. This eliminates the need for any intermediate device to affect link quality, as the virtual testbed nodes are configured to dynamically change the link quality. The operational characteristics may specified for individual nodes or through a batch selection via interface 202. Operational characteristics may also be scripted using a text-based interface, which allows for the operating system selections to be saved for future experiments.

The above described configuration information is derived from the testbed node settings data stored in database 208. For example, the full description of the target network may identify a specific router (e.g., a router manufacturer and part number) having specific configuration settings (e.g., routing tables, routing protocols, etc.); database 208 may include testbed node settings data used to instantiate a configured (or configurable) virtual router to be used by the test network of the testbed that matches this specific router. Alternatively, if no such settings exist, embodiments of the disclosure may select from a plurality of other virtual router settings that best match said specific router, or may auto-populate missing settings with settings that keep the node's configuration valid. This information is included in router information 216.

Virtual environment provisioning logic 220 ensures that the testbed nodes, when interconnected, replicate the topology and runtime characteristics of the target network. Thus, in contrast to prior art solutions, which require a tester to manually build an emulated environment of physically connected network devices, embodiments of the disclosure receive or derive a target network description and build out a replica of this description using virtual testbed nodes executed via physical infrastructure nodes. This process allows for the creation of very large (e.g., tens of thousands of network elements) and/or very topologically complex test networks. Based on the provisioned large scale design, network testbed configuration and deployment 222 is generated so that a network testbed may be deployed that is capable of fully testing and verifying the design and/or aspects of the target network. More specific details of said virtual environment provisioning are described in FIG. 3A-3B.

Figure 3A:
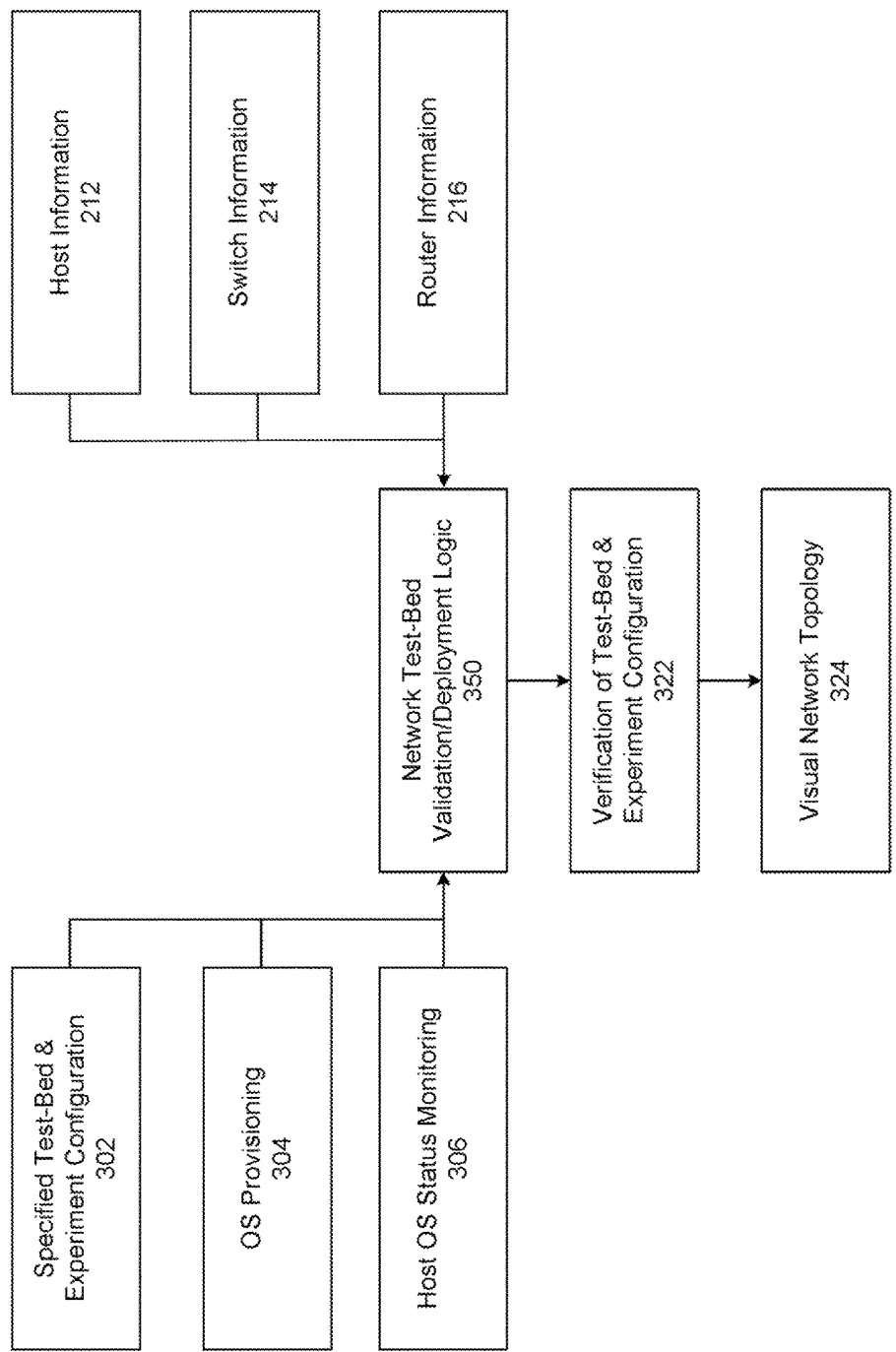
FIG. 3A and FIG. 3B illustrate a network testbed validation tool according to an embodiment of the disclosure.
Figure 3B:
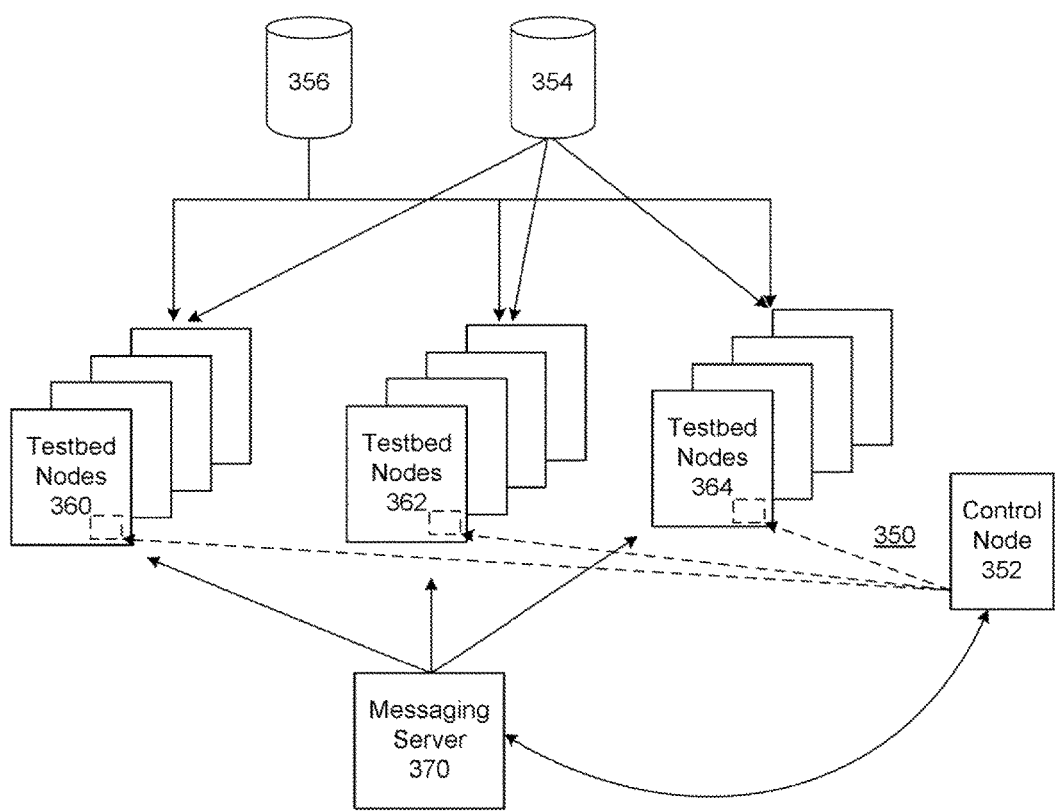

FIG. 3A and FIG. 3B illustrate a network testbed validation tool according to an embodiment of the disclosure. As illustrated in FIG. 3A, network testbed validation/deployment logic 350 is shown to receive host information 212, switch information 214 and router information 216 as illustrated in FIG. 2 and described above.

In this embodiment, network testbed validation/deployment logic 350 further receives specified testbed and experimentation information 302, which includes the design of the virtualized environment of the testbed, as well as the experimentation information to be executed on the testbed to test one or more aspects of the test network.

Network testbed validation/deployment logic 350 is also shown to receive OS provisioning information 304 and host OS status monitoring information 306. The testbed nodes are provisioned with the OS to allow their applications to run in their native operating environment (i.e., the operating environment as configured in the target network to be validated). Provisioning of the OS to be executed by the nodes of the testbed may be implemented in a variety of ways. For example, an entire OS image may be downloaded prior to operation of the OS at the node by using a point-to-point network approach—wherein a separate copy of the OS is transmitted to each node. Another example is to provision the OS image during streaming—i.e., blocks of the OS image are copied to local storage at the node (e.g. a hard disk of a computing device or memory allocated to a VM) to accumulate a local image of the operating system; during operations of the OS, required blocks may be accessed locally if available, or streamed from the server if not and then added to local storage in order to increase the scale of nodes executing an OS. The host OS status monitoring information may be generated by monitoring aspects of the host OS, including connectivity, file system status, processor and memory usage, network variables, etc. Said host may also include a bare metal hypervisor (i.e., virtual machine monitor (VMM)) that runs directly on the host hardware for controlling the hardware and for monitoring guest operating systems. Embodiments may determine if any aspects of the host are unknown or in an error state.

Network testbed validation/deployment logic 350 may validate, verify, and visualize the configured test network for the testbed. Verification results of the received testbed and experiment configuration information 322 may include a verification that each of the instantiated virtual testbed nodes are configured consistent with the network elements of the target network so that realistic network conditions are emulated in the test network. For example, said test network may include multiple routers, each having a unique configuration. Embodiments of the disclosure may generate an output file that includes configuration for all routers, or a specific router (e.g., in response to a user query). For example, a user may issue a query for verify a specific configuration aspect of a specific router (e.g., a BGP and routing table of one of the routers).

In this embodiment, visual network topology information data 324 is generated to allow a user to have a visual model to quickly identify the elements of the test network. Said visual network topology may also include data displaying flows between testbed nodes in a topological form, so that the user may validate the overall structure of the test network.

FIG. 3B is a block diagram an architecture for a network testbed validation/deployment logic according to an embodiment of the disclosure. In this embodiment, validation/deployment logic 350 comprises control node 352 and interface modules in each of the nodes of testbed node sets 360, 362 and 364.

Image database 354 comprises a database storage of VM images and image metadata store 356 comprises a storage of corresponding metadata (i.e., configuration data). In this embodiment, upon power-up the physical infrastructure elements of the testbed network, a pre-boot execution environment (PXE) built into the supporting network hardware queries image database 354 and image metadata store 356 and loads the specified operating environment for each testbed node (i.e., virtual or physical testbed node). The operating system images may be selected for individual nodes or through a batch select. The selection may also be scripted using a text-based interface which allows for the operating system selections to be saved for future experiments.

The physical infrastructure elements may use a PXE Dynamic Host Configuration Protocol (DHCP) request packet to contact image databases 354 and 356, which may use the PXE client/server protocol to retrieve the operating environment image and upload it to the physical infrastructure elements after it has been verified. The system is then booted with the (now local) image; an indication is received by control node 352 when each testbed node is booted. In some embodiments, the physical infrastructure elements of testbed node sets 360, 362 and 364 are presented as a cloud-based network connectivity provisioning resource for which clients may store, lookup, and execute virtual machine images on demand.

In some embodiments, each physical infrastructure node is pre-loaded with logic or modules that communicates with control node 352 using Advance Message Queuing Protocol (AMQP), a publisher/subscriber communication model. For example, in embodiments utilizing cloud-based resources, control node 352 may update the AMQP publisher/subscriber list, and then use multicast-like messaging to distribute the appropriate virtual network to a cloud-based network service that resides on each physical infrastructure node to interact with the controller node.

The cloud-based network service may then configure the virtual network interfaces based on the specifications in the target network description. Similarly, control node 352 may use AMQP messaging to a cloud-based virtual machine provisioning service on each physical infrastructure node to specify the quantity and image configuration for any virtual device or virtual interface to any physical testbed nodes.

In some embodiments, by having the cloud-based services reside locally on each physical infrastructure node, the configuration distribution of the testbed may operate in parallel and is only limited by the control plane network and the response time of the image databases.

In this embodiment, control node 352 controls the scheduling of the virtual testbed nodes of compute nodes sets. Control node 352 may include a scheduler to control the resource usage among the virtual machines. Scheduling optimization may include, for example, increasing virtual machine densities, ensuring a fast boot time for virtual testbed nodes, enabling re-configurability of virtual testbed nodes without requiring any changes to the physical infrastructure nodes of the test network, and emulating network devices of the target network in a manner that is not limited by the physical infrastructure nodes of the test network.

Control node 352 may configure the deployment of the virtual testbed nodes to increase the VM density of the system. VM density refers to the number of VMs that utilize the same hardware resources (e.g., processor, memory, host platform, etc.). In embodiments of the disclosure, virtual testbed nodes having similar characteristics are identified so that they may "scheduled" to share hardware resources. Grouping like nodes together may also be referred to herein as "de-duplication."

For example, a target network may comprise multiple nodes executing the same OS, but different security patch revisions (e.g., different Windows service packs). Embodiments of the disclosure may group the corresponding virtual testbed nodes to share hardware resources, such as a base OS image, so that the memory allocated for each different testbed node is limited by their respective security patch revision.

Furthermore, in some embodiments, expected runtime requirements (e.g., memory usage, expected execution speed, etc.) of virtual testbed nodes are analyzed to determine if de-duplication may occur. For example, some virtual testbed nodes may be configured to emulate a network hardware element having a certain timing requirement or memory usage that would not be met if said virtual testbed node shared hardware resources with other nodes. This optimization guarantees an equivalent test network performance while still selectively optimizing VM scheduling to increase VM density on the hardware resources.

During the runtime of the test network, it may be determined that a workload of a virtual testbed node is exceeding its expected workload; for example a virtual testbed node configured to share hardware resources with other nodes may have a runtime resource usage that exceeds the capabilities of the shared hardware resources. In some embodiments, this virtual testbed node may be moved to another physical infrastructure node via any VM live migration process known in the art. The capabilities of this dynamic testbed reconfiguration process may be limited by the complexity and size of the deployed test network, the hardware resources available, etc.

Computer networks rarely comprise a large number of unique host devices; thus, when emulating a target network, corresponding testbed nodes in embodiments of the disclosure may not utilize a high number of homogenous VMs. In addition to increasing VM density, embodiments of the disclosure may reduce the boot time of virtual testbed nodes by having said nodes boot from a common boot state.

For example, embodiments of the disclosure may identify a set of virtual testbed nodes having a common virtual image boot state from a base virtual image; the boot process for these testbed nodes may eventually diverge from the common virtual image boot state. Thus, embodiments may boot a first virtual testbed node of the set of identified virtual testbed nodes from the base virtual image to generate the common virtual boot state, and subsequently boot the remaining set of identified virtual testbed nodes from the common virtual boot state. This may be done by hibernating the OS during a specific state, replicating this hibernated state, and dynamically modifying each instance according to the respective virtual testbed node configuration settings.

The network testbed is executed via a plurality of physical infrastructure nodes. The virtual testbed nodes utilize these hardware resources as a network "fabric," thereby enabling rapid reconfiguration of the virtual testbed nodes. For example, a user may request changes to the testbed nodes of the test network (e.g., adding/removing nodes, or reconfiguring the test network completely in response to receiving description information for a different network). The virtual testbed nodes of the test network would be reconfigured, but underlying hardware resources would not require changes (i.e., none of the physical infrastructure nodes need to be reconfigured or re-wired).

Furthermore, embodiments of the disclosure allow for the virtual testbed nodes of the test network to be dynamically reconfigured or removed to simulate real-world conditions on the testbed. For example, to test the QoS of a target network, embodiments may reconfigure the virtual testbed nodes to determine their potential effect on the QoS (e.g., link quality, link latency). Embodiments may also simulate data routes over large distances by reconfiguring virtual testbed nodes to add associated jitter or delay for a tested transmission.

Embodiments of the disclosure also enable virtual testbed nodes to have characteristics that are not limited by their corresponding hardware elements. For example, a router of a target network may be specified as providing a link having a bandwidth (e.g., 40 Gb/s) larger than any link of a hardware router of the test network (e.g., 1 Gb/s). Rather than requiring the addition of an equivalent hardware router to the test network, embodiments of the disclosure may configure one of the virtual testbed nodes of the test network to instantiate a virtual router corresponding to the identified high bandwidth router of the target network, wherein the virtual router provides a link via a high bandwidth hardware communications bus. Thus, in this embodiment, the scheduler may place virtual testbed nodes interconnected via the above described virtual router on the same host so that they are interconnected via said hardware communications bus.

Embodiments of the disclosure may configure a test network to include both physical and virtual testbed nodes. For example, a specific physical device may be interconnected with virtual testbed nodes of the test network. In this example, the specific physical device may be fully tested by placing the device in an emulated network that replicates the target network in both size and complexity. This interoperability between live and emulated devices in a full scale emulated network allows for testing aspects such as cyber security and fault propagation at high level of fidelity.

Once each testbed node has been configured, powered-on, and is running, its status is then sent or requested from control node 352 to verify that the specified experimental testbed matches the provisioned resources. Additional information such as router peer tables, BGP and Open Shortest Path First (OSPF) settings, etc. may also be queried and sent to the control node 352 for verification.

Figure 4:
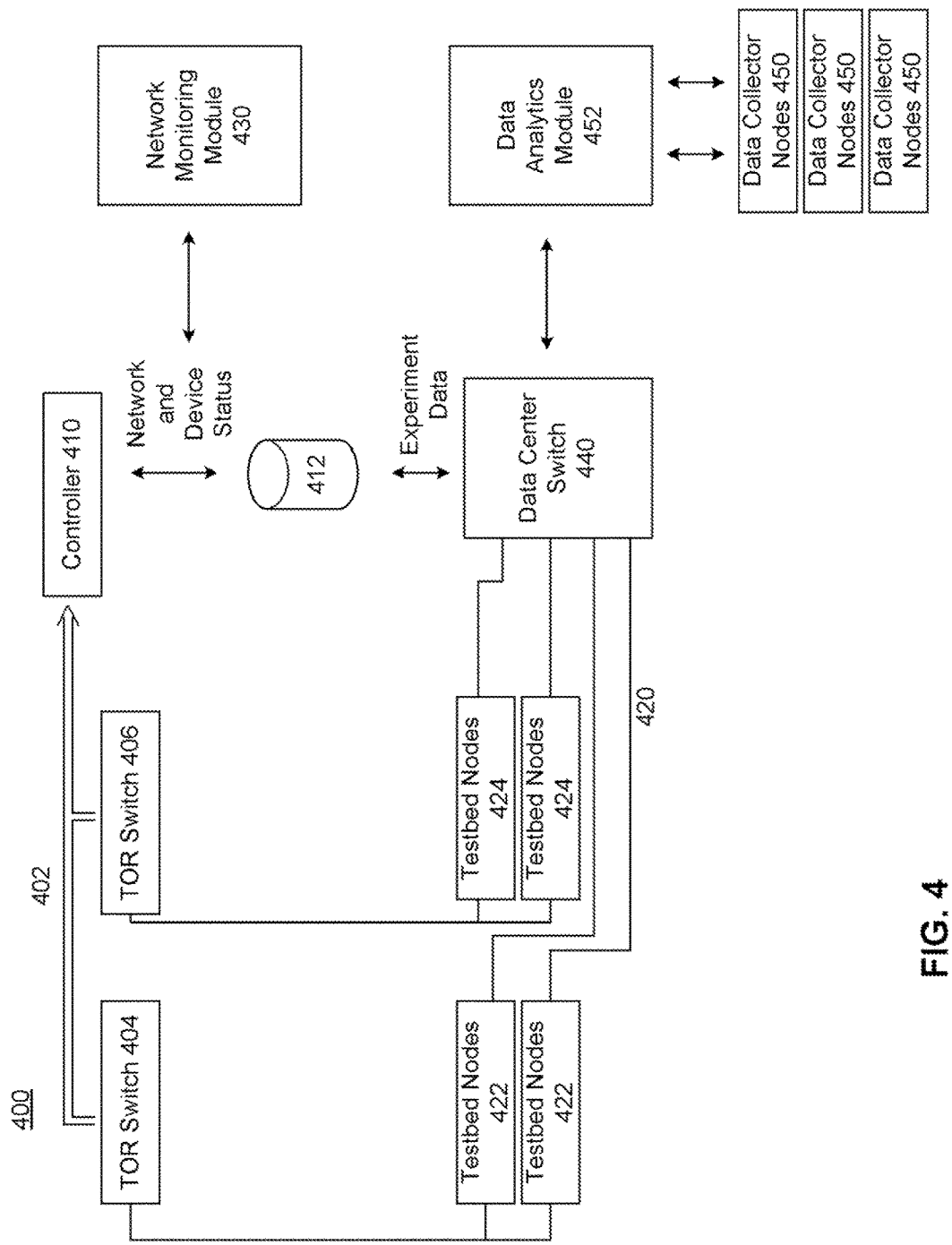
FIG. 4 is a block diagram of a network testbed, including experiment control and data capture modules, according to an embodiment of the disclosure.

FIG. 4 is a block diagram of a network testbed, including experiment control and data capture modules, according to an embodiment of the disclosure. In this embodiment, control plane 402 is the control network of testbed 400, and is shown to interconnect experiment controller 410 to top-of-rack (TOR) switches 404 and 406. The TOR switches communicatively couple controller 410 to testbed node sets 422 and 424. As discussed above, the testbed node sets comprise configurable virtual nodes executed via physical infrastructure hardware to create an emulated network. Node configuration data such as control data, experiment setup, system status, etc., are communicated through this control network. Once the testbed has been specified, the configuration settings may be saved within a profile to storage 412 so that it may be subsequently accessed to repeat specific experiments.

The testbed nodes are shown to the coupled via experiment data plane 420 to output experiment data via data center switch 440. In this embodiment, control plane 402 is illustrated to be physically isolated from experiment data plane 420 so that corrupt data, faults, or software failures on the testbed network do not affect other components or systems—e.g., controller 410, host networks that interact with the testbed, etc.

Testbed node sets 422 and 424 enable the creation of large scale, complex emulated networks configurable for advanced experiment parameters such as communication link quality including jitter, latency, random fault injection, and the ability to import and emulate real network and Internet conditions. For fault tolerance experimentation, the network link quality interface has the ability to handle fault injection. The faults may be specified for specific links, sub-networks, or on the full testbed network. The fault injections may be randomized in timing, location, and type (e.g. specific header fields, random bit locations, etc.)

Controller 410 may also load selectable and configurable experiment test vectors such as cyber-security attacks onto testbed node sets 422 and 424. Some of the testbed nodes may be designated as network traffic generators; these nodes may interface to commercially available traffic generators or may be setup to replay packet capture (PCAP) files from real systems. These traffic generator nodes may also generate random data streams to create a noisy testbed network environment. As discussed above, the testbed capabilities may be extended through the use of virtual interfaces into the experimental network and allow the testbed to use new technologies and communication protocols. The extended capabilities may include satellite communication technology (i.e., satellite network support components not including the satellite transmission components), SCADA control system technology, wireless communications, virtual control emulation modules, and many other technologies.

Network monitoring software 430 may execute passive or active network monitoring processes (e.g., simple network management protocol (SNMP), sFlow, netFlow, traceroute, nmap, ping, etc.) to generate network and device status information (shown to be stored in storage 412). Experiment data for testbed node sets 422 and 424 is generated based, at least in part, on the network and device status information, thereby allowing for advanced experiment parameters, such as communication link quality including jitter, latency, random fault injection, and the ability to import and emulate real network conditions.

In this embodiment, a data collection subsystem including data center switch 440, data analytics module 452, and data collector nodes 450 is used to capture all network data exchanged via experiment plane 420; thus, runtime network data may be extracted without interfering with the performance or function of the testbed network. In some embodiments, during runtime of the testbed network, a destination of the captured network traffic may be switched among data collector nodes.

Data center switch 440 further ensures that all communication between the physical infrastructure nodes is also connected to the data collection server using the switch's configuration interface. Data analytics module 452 may provide the ability to capture and index all testbed data formats, index real-time and stored data for fast query response times, provide time-based correlations, and provide data visualization in multiple formats (e.g., pie charts, time-series plots, bar charts, geographic overlays, etc.)

Embodiments of the disclosure may further capture network traffic exchanged between the virtual testbed nodes, wherein the network traffic includes data captured from a hardware communication bus interconnecting a plurality of hardware infrastructure elements of the testbed (i.e., the underlying network fabric of the virtual testbed nodes of the testbed network). Communication that occurs between virtual devices on the same physical node is captured by the hypervisor and sent to the data collection subsystem; normally this VLAN-type of communication is not visible on physical network devices.

In some embodiments, Software-Defined Network (SDN) components are integrated into the testbed network infrastructure to provide configurability and flexibility in setting up and configuring data collector nodes 450 for network traffic and device status generated during experimentation. For example, control logic may govern the forwarding behavior of monitored network switching elements on a per node basis. Said control creates and maintains a view of the network state and provides an API upon which analytics applications may access a view of the network state during testbed experimentation. Said SDN may comprise any protocol known in the art, such as OpenFlow.

Figure 5:
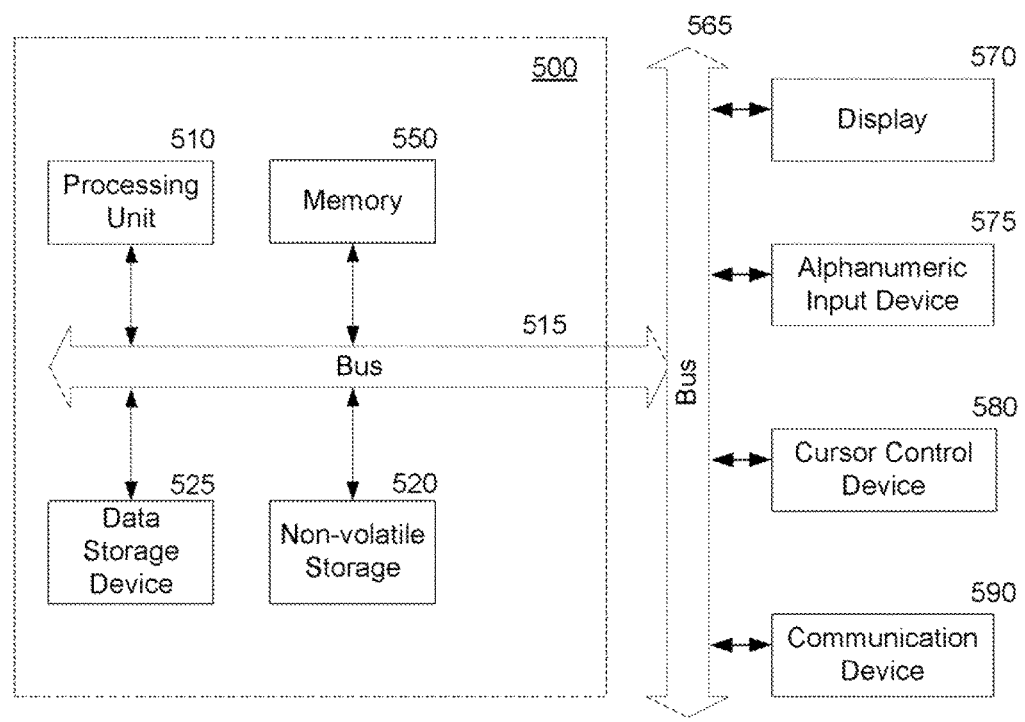
FIG. 5 is an illustration of a computing device to utilize an embodiment of the disclosure.

FIG. 5 is an illustration of a computing device to utilize an embodiment of the disclosure. Platform 500 may be used to execute any portion of the network testbed creation and validation execution environments described above. Platform 500 as illustrated includes bus or other internal communication means 515 for communicating information, and processor 510 coupled to bus 515 for processing information. The platform further comprises random access memory (RAM) or other volatile storage device 550 (alternatively referred to herein as main memory), coupled to bus 515 for storing information and instructions to be executed by processor 510. Main memory 550 also may be used for storing temporary variables or other intermediate information during execution of instructions by processor 510. Platform 500 also comprises read only memory (ROM) and/or static storage device 520 coupled to bus 515 for storing static information and instructions for processor 510, and data storage device 525 such as a magnetic disk, optical disk and its corresponding disk drive, or a portable storage device (e.g., a universal serial bus (USB) flash drive, a Secure Digital (SD) card). Data storage device 525 is coupled to bus 515 for storing information and instructions.

Platform 500 may further be coupled to display device 570, such as a cathode ray tube (CRT) or an LCD coupled to bus 515 through bus 565 for displaying information to a computer user. In embodiments where platform 500 provides computing ability and connectivity to a created and installed display device, display device 570 may comprise any of the created and display devices described above. Alphanumeric input device 575, including alphanumeric and other keys, may also be coupled to bus 515 through bus 565 (e.g., via infrared (IR) or radio frequency (RF) signals) for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570. In embodiments utilizing a touch-screen interface, it is understood that display 570, input device 575 and cursor control device 580 may all be integrated into a touch-screen unit.

Another device, which may optionally be coupled to platform 500, is a communication device 590 for accessing other nodes of a distributed system via a network. Communication device 590 may include any of a number of commercially available networking peripheral devices such as those used for coupling to an Ethernet, token ring, Internet, or wide area network. Communication device 590 may further be a null-modem connection, or any other mechanism that provides connectivity between computer system 500 and the outside world. Note that any or all of the components of this system illustrated in FIG. 5 and associated hardware may be used in various embodiments of the disclosure.

It will be appreciated by those of ordinary skill in the art that any configuration of the system illustrated in FIG. 5 may be used for various purposes according to the particular implementation. The control logic or software implementing embodiments of the disclosure can be stored in main memory 550, mass storage device 525, or other storage medium locally or remotely accessible to processor 510. It will be apparent to those of ordinary skill in the art that any system, method, and process to capture media data as described herein can be implemented as software stored in main memory 550 or read only memory 520 and executed by processor 510. This control logic or software may also be resident on an article of manufacture comprising a computer readable medium having computer readable program code embodied therein and being readable the mass storage device 525 and for causing processor 510 to operate in accordance with the methods and teachings herein.

Embodiments of the disclosure may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 510, data storage device 525, bus 515, and memory 550, and only rudimentary communications mechanisms, such as a small touch-screen that permits the user to communicate in a basic manner with the device. In general, the more special-purpose the device is, the fewer of the elements need be present for the device to function.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the process blocks appear in each process should not be deemed limiting. Rather, one of ordinary skill in the art having the benefit of the present disclosure will understand that some of the process blocks may be executed in a variety of orders not illustrated.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a non-transitory computer-readable storage medium includes recordable/non-recordable media (e.g., read only memory (ROM), random access memory (RAM), magnetic disk storage media, optical storage media, flash memory devices, etc.).

The above description of illustrated embodiments of the disclosure, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A non-transitory computer readable storage medium including instructions that, when executed by one or more processors, cause the processors to perform a method comprising:
receiving network description information for a target network, wherein the network description information comprises an abstract logical description of a design of the target network;
identifying network elements of the target network based, at least in part, on the received network description information;
accessing a memory including pre-stored testbed node settings data for configuring a plurality of network testbed nodes of a network testbed;
identifying the pre-stored testbed node settings data for each of the identified network elements of the target network;
generating configuration data for a plurality of virtual testbed nodes of a test network of the network testbed, wherein each of the virtual testbed nodes is to correspond to one of the identified network elements of the target network, wherein the configuration data for each of the virtual testbed nodes is based, at least in part, on the identified pre-stored testbed node settings data for the respective identified network element of the target network, and wherein the plurality of virtual testbed nodes are executed via a plurality of hardware resources of the test network to replicate the target network;
wherein generating configuration data for the plurality of virtual testbed nodes of the test network of the network testbed includes:
identifying a router and a first network element included in the target network, wherein the router is coupled to the first network element via a first link that has a bandwidth larger than any link of a hardware router included in the hardware resources of the test network;
configuring a first virtual testbed node of the plurality of virtual testbed nodes, to instantiate a virtual router corresponding to the identified router and a second virtual testbed node of the plurality of virtual testbed nodes corresponding to the first network element of the target network; and
allocating a same physical infrastructure node of the test network to execute the first and the second virtual testbed nodes, wherein the first and the second virtual testbed nodes are coupled via a second link using a hardware communication bus of the physical infrastructure node, wherein the bandwidth of the router is the same as the second link; and
comparing the network description information of the target network and the configuration data for the plurality of virtual testbed nodes to verify that executing the plurality of virtual testbed nodes replicates the design of the target network.

2. The non-transitory computer readable storage medium of claim 1, wherein generating configuration data for the plurality of virtual testbed nodes of the test network comprises:
increasing a density of the virtual testbed nodes to be executed via each of the plurality of hardware resources of the test network based, at least in part, on the identified pre-stored testbed node settings data for each of the identified network elements of the target network, including:
identifying a set of virtual testbed nodes having at least some matching identified pre-stored testbed node settings data; and
allocating a same hardware resource to execute the identified set of virtual testbed nodes.

3. The non-transitory computer readable storage medium of claim 2, wherein the method further comprises:
determining to not allocate the same hardware resource to execute the identified set of virtual testbed nodes based, at least in part, on an expected memory usage or an expected execution speed indicated by the identified pre-stored testbed node settings data for the set of virtual testbed nodes.

4. The non-transitory computer readable storage medium of claim 1, wherein generating configuration data for the plurality of virtual testbed nodes of the test network of the network testbed includes:
   identifying a set of virtual testbed nodes having a common virtual image boot state from a base virtual image;
   booting a first virtual testbed node of the set of identified virtual testbed nodes from the base virtual image to generate the common virtual boot state; and
   booting the remaining set of identified virtual testbed nodes from the common virtual boot state.

5. The non-transitory computer readable storage medium of claim 1, wherein the network configuration data comprises runtime network traffic data captured from a traffic flow or packet flow module, or network exploratory data generated from at least one of a PING utility or a traceroute utility, and the method further comprises:
   generating a network topology based on the runtime network traffic data or network exploratory data to identify the network elements of the target network, wherein the abstract logical description of the design of the target network includes the generated network topology.

6. The non-transitory computer readable storage medium of claim 1, wherein the method further comprises:
   detecting a change to the test network comprising a removal or an insertion of one or more hardware resources of the test network; and
   generating updated configuration data for the plurality of virtual testbed nodes of the test network of the network testbed in response to detecting the change to the test network.

7. The non-transitory computer readable storage medium of claim 1, wherein the method further comprises:
   executing a test for the target network via the network testbed, wherein the test includes operations for simulating runtime changes for one or more network elements of the target network; and
   dynamically re-configuring one of more of the virtual testbed nodes of the test network of the network testbed to simulate the runtime changes for the one or more network elements of the target network.

8. The non-transitory computer readable storage medium of claim 1, wherein the test network of the network testbed includes one or more non-virtualized physical nodes.

9. The non-transitory computer readable storage medium of claim 1, wherein the method further comprises:
   capturing network traffic exchanged between the virtual testbed nodes of the test network of the network testbed during an execution of a test for the target network, wherein the network traffic includes data captured from a hardware communication bus interconnecting a plurality of hardware resources of the test network.

10. The non-transitory computer readable storage medium of claim 9, wherein the method further comprises:
    during execution of the test for the target network, updating a destination of the captured network traffic from a first data collector node of the test network to a second data collector node.

11. The non-transitory computer readable storage medium of claim 1, wherein the network description information describes the target network as at least one of a large area network, a supervisory control and data acquisition (SCADA) centralized system, a cellular network infrastructure, or a cloud computing infrastructure.

12. The non-transitory computer readable storage medium of claim 1, wherein the method further comprises:
    designating a set of virtual testbed nodes as network traffic generators, wherein the network traffic generators generate random data streams to create a noisy network environment to simulate real-world network conditions on the network testbed.

13. The non-transitory computer readable storage medium of claim 1, wherein generating configuration data for the plurality of virtual testbed nodes of the test network includes:
    specifying experimental operating characteristics of each of the virtual testbed nodes of the test network, and wherein the experimental operating characteristics includes at least one of a packet request response time, a processing latency, or a propagation delay.

14. The non-transitory computer readable storage medium of claim 1, wherein generating configuration data for the plurality of virtual testbed nodes of the test network includes:
    specifying testbed experiment parameters describing links between each of the virtual testbed nodes of the test network, wherein the testbed experiment parameters are configured to replicate real-world conditions of the target network, wherein the testbed experiment parameters are a function with random jitter, and wherein the testbed experiment parameters describe at least one of a percentage of dropped packets, an amount of burst traffic, a bandwidth limitation, or a latency.

15. The non-transitory computer readable storage medium of claim 1, wherein the method further comprises:
    executing a test for the target network via the network testbed, wherein the test includes simulating random fault injections, and wherein the random fault injections are randomized in at least one of a timing, a location, or a type.

* * * * *